United States Patent [19]

Tazaki et al.

[11] Patent Number: 4,881,274
[45] Date of Patent: Nov. 14, 1989

[54] FM MULTIPATH NOISE REDUCTION CIRCUIT

[75] Inventors: Satoru Tazaki; Yasuhiro Yoshioka, both of Tokyo, Japan

[73] Assignee: Clarion Co., Ltd., Tokyo, Japan

[21] Appl. No.: 152,531

[22] Filed: Feb. 5, 1988

[30] Foreign Application Priority Data

Feb. 13, 1987 [JP] Japan .............................. 62-19759[U]

[51] Int. Cl.[4] ............................................. H04B 1/10
[52] U.S. Cl. .................................... 455/296; 455/297; 455/307; 381/13; 320/1; 307/109
[58] Field of Search ............... 455/297, 298, 296, 299, 455/303, 307, 343, 212; 381/10, 13; 333/24 C; 334/55; 320/1; 307/109, 110

[56] References Cited

U.S. PATENT DOCUMENTS 4,694,500 9/1987 Tazaki et al. ..................... 455/297

Primary Examiner—Joseph A. Orsino
Assistant Examiner—Frank M. Scutch, III
Attorney, Agent, or Firm—Flynn, Thiel, Boutell & Tanis

[57] ABSTRACT

An FM multipath noise reduction circuit is disclosed, in which a condenser for rapid charging is connected between the power source line and a charge/discharge condenser disposed in a level shift circuit system so that the rise time constant of the control output voltage at the power source switch-on, the AM/FM mode switch over, etc. is equal to that after the power source switch-on.

2 Claims, 5 Drawing Sheets

FM MULTIPATH NOISE REDUCTION CIRCUIT

FIELD OF THE INVENTION

This invention relates to an FM multipath noise reduction circuit and in particular to an FM multipath noise reduction circuit suitable for an FM receiver having a rise time constant for the control output voltage.

BACKGROUND OF THE INVENTION

Recently, in the casae where on FM broadcast is received by an FM receiver mounted in a car, output of the reception is hampered by multipath noise produced by so-called FM multipath disturbance due to the fact that a direct wave of the FM broadcast and reflected waves reflected by buildings or mountains are inputted simultaneously in a receiving antenna. Therefore it is very offensive to the ear and the quality of the reception is impaired. For this reason, in order to reduce the multipath noise and to improve the quality of the reception, generally a method described below is adopted.

FIG. 4 is a circuit diagram of a prior art FM multipath noise reduction circuit used in an FM receiver.

The receiving system in such a receiver consists of an FM IF circuit 1 amplifying high frequency signals of e.g. 10.7 MHz and an FM multiplexer (MPX) circuit 2 for demodulating the IF output into FM stereo signals, i.e. left and right side signals.

The multipath noise reduction circuit 3 is connected to this receiving system. This circuit 3 consists of a multipath noise detection circuit 4, in which the S meter voltage $V_s$ corresponding to the received electric field intensity (voltage for driving a meter usually disposed in a receiver and indicating the signal intensity) of the IF circuit 1 is inputted and which detects multipath noise therein, a negative rectification circuit 5 rectifying the signal outputted by the circuit 4 so as to obtain a negative voltage, and an adder 6, which adds the output voltage of this circuit 5 and the meter voltage $V_s$ and applies the sum of them to the FM MPX circuit 2. By such a construction the stereo separation of the FM MPX circuit 2 is controlled by utilizing the S meter voltage, which is proportional to the electric field intensity included in the IF stage and further the S/N ratio is improved by attenuating the signal at the high frequency region.

That is, paying attention to the fact that the S meter voltage is decreased instantaneously, which gives rise to harmonic wave component noise, when FM multipath noise is produced, harmonic wave components are detected by the multipath noise detection circuit 4. When this detected voltage is rectified by the negative rectification circuit 5 and added to the original S meter voltage by means of the adder 6, the voltage $S_{NC}$ outputted by the adder 6 works so as to reduce the S meter voltage, corresponding to the FM multipath noise. In this case the stereo separation of the FM stereo demodulator is varied by using the S meter voltage as the control voltage. The stereo separation is worsened with decreasing value of this voltage and the separation becomes nearer to the monaural state with increasing FM multipath noise. Furthermore, since the attenuation at the high frequency region increases, the S/N ratio increases and thus the quality of the reception is improved.

With progressing fabrication of electronic devices using ICs one-chip ICs (integrated circuits) 10 of block construction, e.g. as indicated in FIG. 5, are more widely used as the multipath reduction circuit 3 enclosed by a broken line in FIG. 4.

In FIG. 5 the multipath reduction circuit 10 is composed of a control output system consisting of a first level shift circuit 11, a charge/discharge circuit 12, a condenser 13 for charge/discharge connected with the charge/discharge circuit 12 and a second level shift circuit 14, and a multipath noise detection system treating the high frequency components (hereinbelow called alternating current voltage $V_{AC}$) due to rapid decrease of the S meter voltage and controlling the charge/discharge circuit 12.

The multipath noise detection system is composed of a V - I converter 15 for V - I (voltage - current) converting the alternating current voltage $V_{AC}$, a current doubler circuit 16, which doubles the converted current and outputs it, a charge/discharge control circuit 17 controlling the charge/discharge circuit 12 on the basis of the output of the circuit 16, a charging current generation circuit 18 for supplying charging current to the charge/discharge circuit 12, and a constant voltage circuit 19 for supplying a stabilized voltage to each of the circuits. Further a condenser $C_1$ is disposed for cutting the direct current component $V_{DC}$ of the S meter voltage $V_S$.

Now the operation of the multipath noise reduction circuit 10 in FIG. 5 will be explained.

When the S meter voltage $V_S$ is inputted, the level shift circuits 11 and 14 output an output voltage $V_O$ (DC OUT), which has a certain relationship to he direct current component $V_I$ (DC IN), as indicated in FIG. 6. A charge/discharge condenser 13 ($C_2$) is charged to a constant voltage, when no multipath noise is produced.

The alternating voltage $V_{AC}$ in the S meter voltage is detected through the V - I converter 15 and the current doubler circuit 16. When it exceeds a certain threshold level A, as indicated in FIG. 7, the charge/discharge condenser 13 is discharged by the charge/discharge control circuit 17, depending on the threshold level, and the output voltage $V_O$ of the second level shift circuit 14 decreases. When the FM multipath noise disappears, the charge/discharge condenser 13 is again charged. FIG. 8 indicates this charge/discharge operation.

In FIG. 8 $T_d$ represents the decay time of the control output voltage $S_{NC}$, when FM multipath noise exceeding a certain threshold level is applied to AC IN and it is set by the external charge/discharge condenser $C_2$ and a resistor $R_O$ not shown in the figure, which is built-in in the IC 10.

$$T_d = C_2 \cdot R_o \quad (1)$$

Further $T_r$ represents the rise time, when the FM multipath noise disappears and the control output voltage returns to its original value, and it can be determined by the external charge/dischare condenser $C_2$ and an external resistor $R_1$. This external resistor $R_1$ determines the charging current of the charge/discharge condenser $C_2$ and $T_r$ is determined by the following formula;

$$T_r = C_2 \cdot V_c / I \quad (2)$$

I : charging current set by external resistor $R_1$
$C_2$ : external charge/discharge condenser
$V_c$ : voltage between charge/discharge condenser $C_2$ and GND Consequently, according to this method the S meter voltage is controlled by utilizing charge/ discharge characteristics of the external charge/discharge condenser $C_2$.

The voltage applied to the external condenser $C_2$ is $(V_I + \Delta V)$, because the direct current $V_I$ applied to DC IN is shifted up by $\Delta V$ by the first level shift circuit 11 and shifted down by $\Delta V$ by the second level shift circuit 14. Further, when DC IN is 0 V, it is at a voltage of $\Delta V$.

Therefore the usual rise time $T_r'$ and the rise time $T_r''$ when the power source is switched-on can be represented by the following formulas;

$$T_r' = \frac{C_2 \cdot V_c}{I} = \frac{C_2 \cdot V_I}{I} \atop T_r'' = \frac{C_2 \cdot V_c}{I} = \frac{C_2 - \Delta V}{I} \quad (3)$$

OBJECT OF THE INVENTION

However, in a prior art FM multipath noise reduction circuit, since the rise time when the power source is switched-on is longer than the usual rise time, the former being $(T_r' + T_r'')$, while the latter is $T_r'$, the control output voltage rises with the rise time consstant of $(T_r' + T_r'')$, even if no FM multipath noise is produced. Therefore it has a problem that it gives a disorderly auditive impression and a feeling as if the MPX circuit worked erroneously, because the monaural state passes slowly into the stereo state.

Further, as indicated in FIG. 9, there is a difference between the rise time at the power source switch-on (a) and that after the power source switch-on (b). That is, it has another problem that the state where the ocntrol output voltage $S_{NC}$ is 0 Volt is maintained during the period of $T_r''$ where the level is shifted by $\Delta V$ in the first level shift circuit 11 so that the separaation in the FM demodulator, the attenuation at the high frequency region, etc. are not controlled at all during this period of time.

The object of this invention is to provide an FM multipath noise reduction circuit, in which the rise time constant at the power source switch-on and the switch over of the AM/FM power source is equal to that after the power source switch-on.

SUMMARY OF THE INVENTION

The object described above can be achieved by connecting a supplemental condenser for rapid charging between the power source line and the charge/discharge condensser in the charge/discharge circuit.

When the power source is switched-on, an excessive current flows from the power source to the charge/discharge condenser through the supplemental condenser for rapid charging and raises rapidly the terminal voltage of the charge/discharge condenser to a certain level. In this way, since the rise time constant of the control output voltage becomes equal to that after the power source switch-on, it doesn't pass from the monaural state into the stereo state.

BRIEF DESCRIPTION OF THE DRAWINS

DETAILED DESCRIPTION

Hereinbelow the FM multipath noise reduction circuit according to this invention will be explained, referring to FIGS. 1 to 3.

Figure 1:
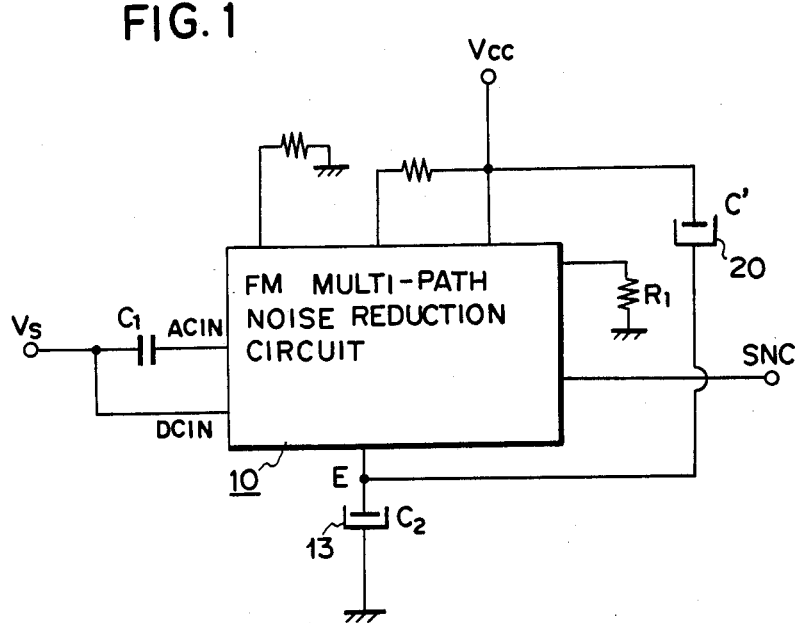
FIG. 1 is a circuit diagram indicating an embodiment of this invention.

FIG. 1 is a circuit diagram indicating an embodiment of this invention.

Figure 5:
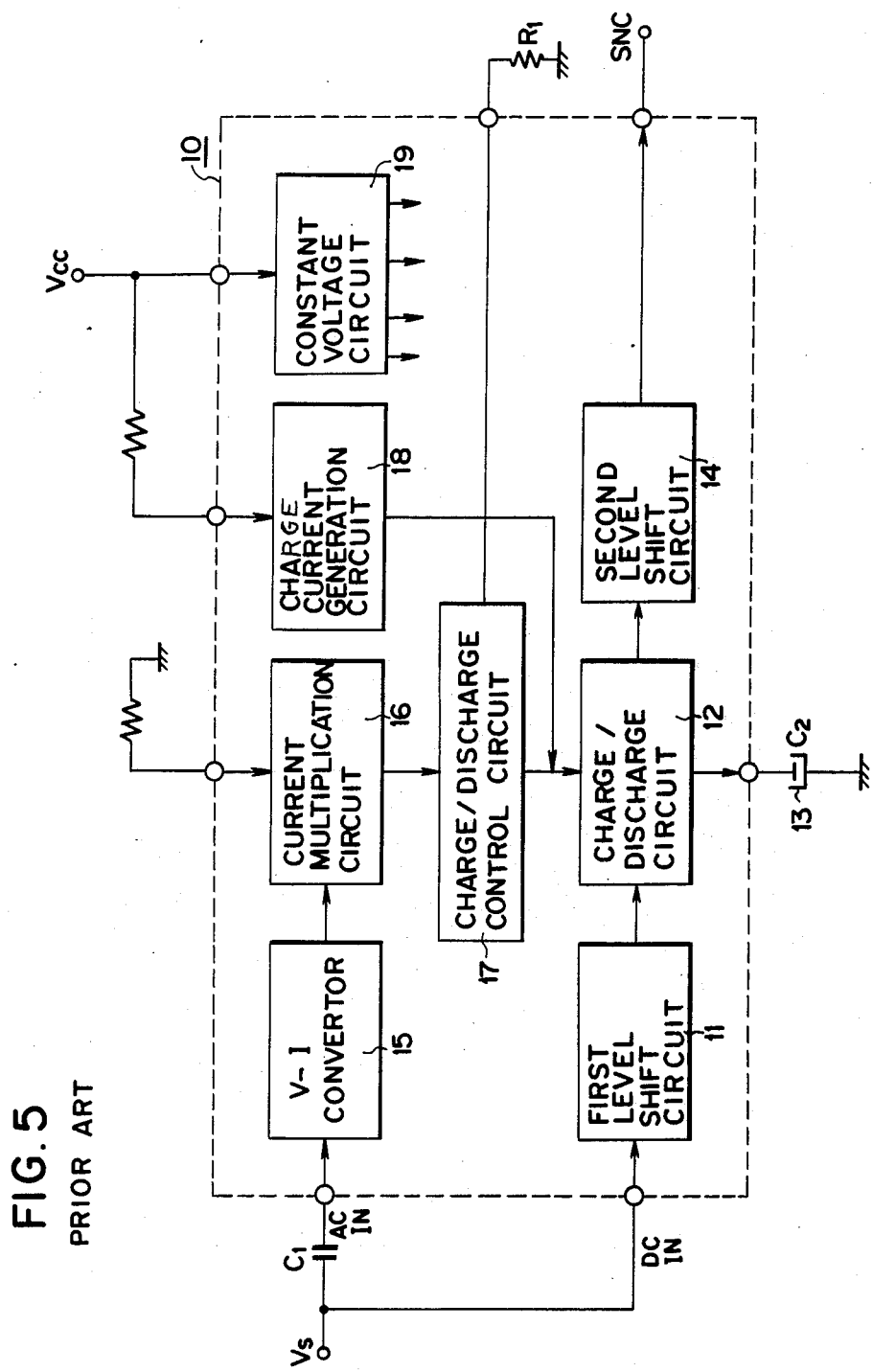
FIG. 5 is a block diagram of a prior art FM multipath noise reduction circuit using an IC.
Figure 6:
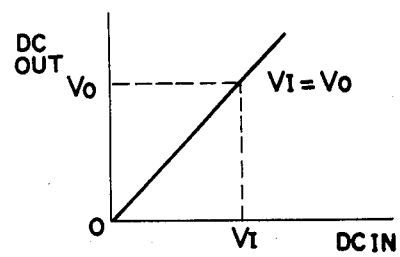
FIG. 6 shows working characteristics of the level shift circuit indicated in FIG. 5.
Figure 7:
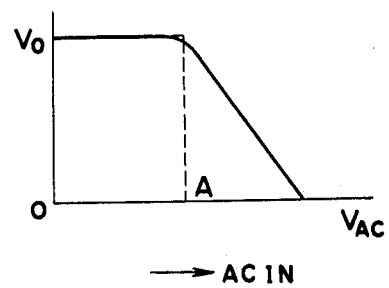
FIG. 7 shows threshold level characteristics.
Figure 8:
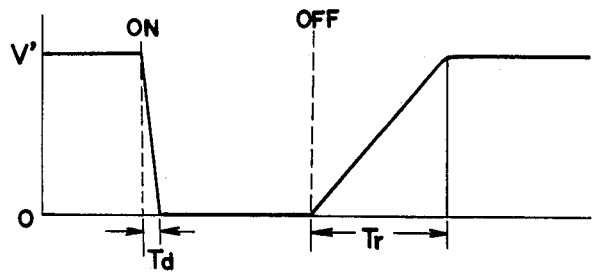
FIG. 8 shows working characteristics of the charge/discharge circuit indicated in FIG. 5.

This embodiment is constructed by connecting a supplemental condenser for rapid charging 20 (C') between the power source Vcc of the circuit 10 indicated in FIG. 5 and the hot end of the charge/discharge condenser 13.

By using such a construction it is possible to charge forcedly the charge/discharge condenser 13 so that its terminal voltage reaches a certain predetermined level by using the excessive current through the supplemental condenser 20 at the power source switch-on.

Figure 2:
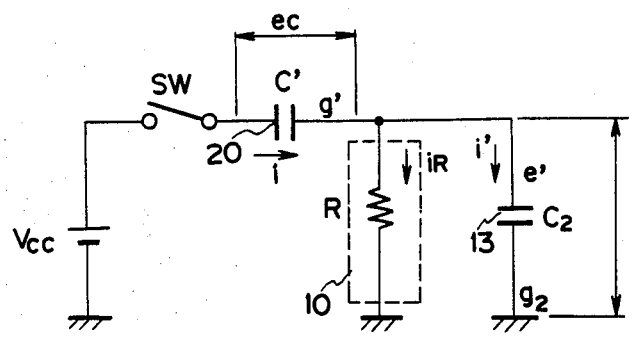
FIG. 2 is an equivalent circuit diagram showing the principle of this invention.

FIG. 2 is an equivalent circuit diagram of the circuit indicated in FIG. 1 for explaining the principle of this invention.

In FIG. 2, at first the switch SW is OFF (before the power source switch-on) and both eand e' are 0 V. When the switch SW is turned ON (at the power source switch-on), the voltage e' can be represented by;

$$e' = \frac{C'}{C_2 + C'} V_{cc} \quad (4)$$

and thus the terminal voltage of the charge/discharge condenser 13 reaches instantaneously the predetermined value.

Now the principle of this invention will be explained by using mathematical formulas and referring to FIG. 2. R in FIG. 2 represents the internal resistance of the control circuit 10.

$$R \cdot i_R = \frac{q_2}{C_2} \atop R \cdot i_R \frac{q'}{C} = V_{cc} \atop \frac{dq'}{dt} = i_R + \frac{dq_2}{dt} \quad (5)$$

(where $i_R$ indicates the intensity of the current flowing through the resistance R; $q_2$ the charge of the charge/discharge condenser $C_2$; and 91 the charge of the supplemental condenser 13.)

Eliminating $i_R$ nd $q_2$ from Eq. (5), the following equation can be obtined.

$$q' = C' \cdot Vcc \left(1 - \frac{C'}{C' + C_2} \epsilon^{-\frac{t}{R(C'+C_2)}}\right) \quad (6)$$

Consequently $$ec = \frac{q'}{C'} = Vcc \left(1 - \frac{C'}{C' + C_2} \epsilon^{-\frac{t}{R(C'+C_2)}}\right)$$

$$e' = Vcc - ec \quad (7)$$

$$= Vcc \frac{C'}{C' + C_2} \epsilon^{-\frac{t}{R(C'+C_2)}}$$

Figure 3:
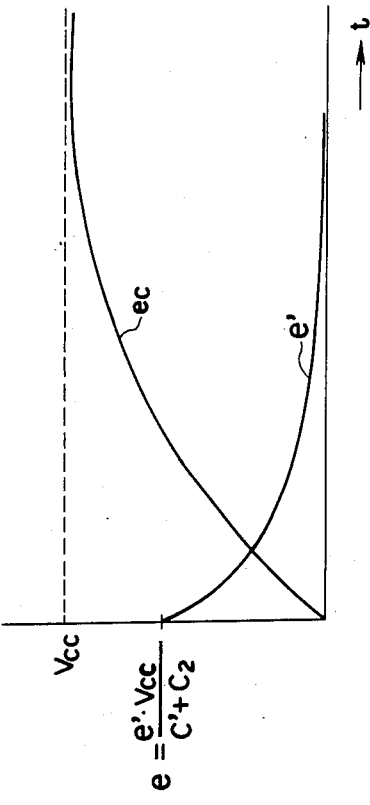
FIG. 3 shows a working waveform for the circuit indicated in FIG. 2.
Figure 4:
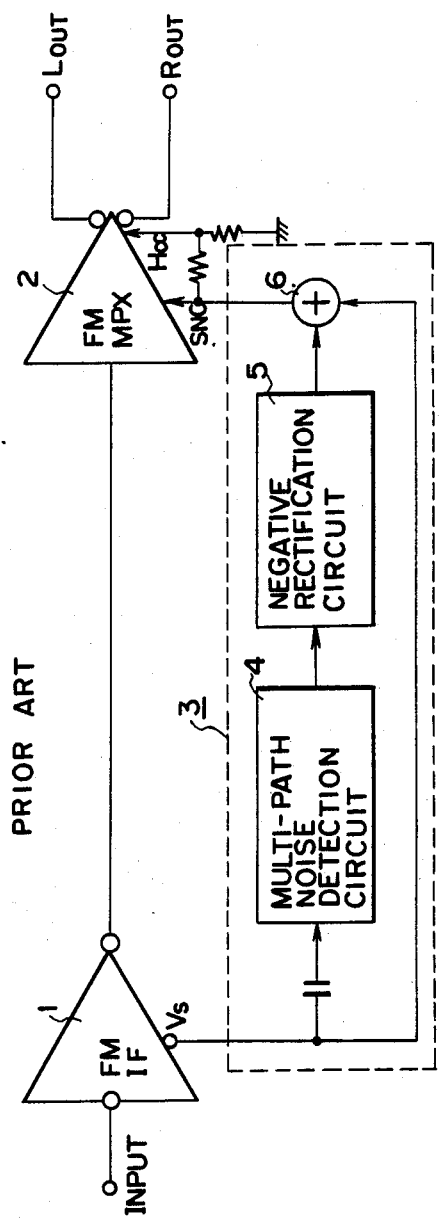
FIG. 4 is a block diagram of a prior arat FM multipath noise reduction circuit.

If this relationship is represented by a graph, the curves indicated in FIG. 3 can be obtained.

Figure 9A:
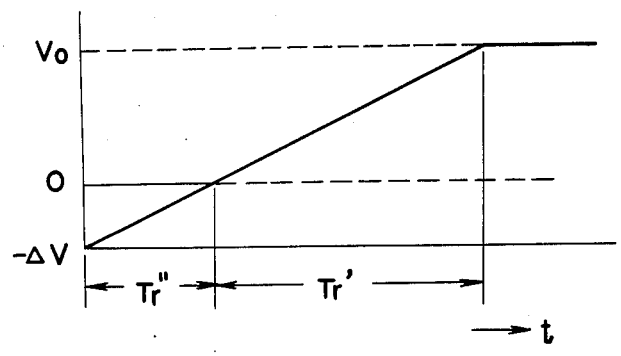
FIG. 9A and 9B shows voltage characteristics for explaining the difference between the rise time at the power source switch-on and that after the power source switch-on in the prior art circuit.
Figure 9B:
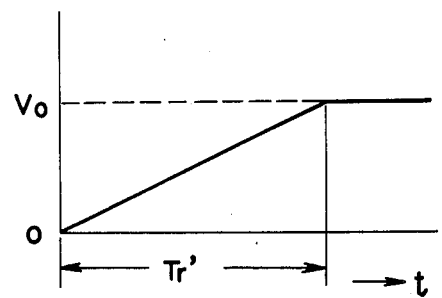

Utilizing these characteristics, by generating instantaneously the voltage given by Eq. (4) at the charge/discharge condenser 13 at the power source switch-on the rise time constant $R_r''$ indicated in FIG. 9 is made 0. In order to realize it, it is sufficient to choose the condensers 20 and 13 so that they saatisfy the following relation;

$$\Delta V = \frac{C'}{C_2 + C'} \cdot Vcc$$

Further the rise time constant $(T_r'' + T_r')$ can be improved by choosing a great voltage value for $e'$.

As explained above, according to this invention, since the work at the power source switch-on can be made equal to that after the power source switch-on, it is possible to remove the disorderly auditive impression. Furthermore it is possible to remove also the disorderly auditive impression due to the passage from the monaural to the stereo state at the switch-over of the FM/AM power source.

The embodiments of the invention in which an exclusive propety or privilege is claimed are defined as follows:

1. An FM multipath noise reduction circuit, comprising;
    a charge/discharge circuit having an output, and having an input to which is applied an S meter voltage which corresponds to a received electric field intensity and which is outputted by an intermediate frequency amplification stage in an FM stereo receiver;
    a first condenser having first and second ends, said first end being connected to said charge/discharge circuit;
    charge/discharge control circuit means for detecting in said S meter voltage an alternating current voltage corresponding to multipath noise and for causing said charge/discharge circuit to respectively discharge and charge said first condenser in response to detection of the presence and absence, respectively, of said alternating current voltage, said charge/disicharge circuit producing at said output thereof a control voltage having a value which varies as a function of the amount of charge on said first condenser;
    a second condenser for rapid charging which has two ends respectively connected to a power source and said first end of said first condenser, said power source further being connected to and supplying power to said charge/discharge circuit and said charge/discharge control circuit means; and
    control means for controlling signal separation of the FM demodulation in said FM stereo receiver as a function of said control voltage from said output of said charge/discharge circuit.

2. An FM multipath noise reduction circuit according to claim 1, wherein said second end of said first condenser is connected to ground.

* * * * *